US009153010B2

(12) United States Patent
Tezuka

(10) Patent No.: US 9,153,010 B2
(45) Date of Patent: Oct. 6, 2015

(54) IMAGE PROCESSING DEVICE AND IMAGE PROCESSING METHOD GENERATING A HIGH-RESOLUTION IMAGE FROM A LOW-RESOLUTION IMAGE

(75) Inventor: Tadanori Tezuka, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 49 days.

(21) Appl. No.: 13/983,171

(22) PCT Filed: Jan. 31, 2012

(86) PCT No.: PCT/JP2012/000604
§ 371 (c)(1),
(2), (4) Date: Aug. 1, 2013

(87) PCT Pub. No.: WO2012/132183
PCT Pub. Date: Oct. 4, 2012

(65) Prior Publication Data
US 2013/0308877 A1 Nov. 21, 2013

(30) Foreign Application Priority Data

Mar. 28, 2011 (JP) ................................. 2011-069668

(51) Int. Cl.
*G06K 9/32* (2006.01)
*G06T 3/40* (2006.01)
*H04N 1/40* (2006.01)

(52) U.S. Cl.
CPC ............. *G06T 3/4007* (2013.01); *G06T 3/4053* (2013.01); *H04N 1/40068* (2013.01)

(58) Field of Classification Search
None
See application file for complete search history.

(56) References Cited

U.S. PATENT DOCUMENTS

2006/0115184 A1 6/2006 Michel
2010/0033602 A1 2/2010 Okada et al.
(Continued)

FOREIGN PATENT DOCUMENTS

JP 2001-177719 6/2001
JP 2006-155179 6/2006
(Continued)

OTHER PUBLICATIONS

International Search Report issued Mar. 13, 2012 in International (PCT) Application No. PCT/JP2012/000604.
Masayuki Tanaka et al., "A Fast Algorithm for Reconstruction-Based Super-Resolution and Its Accuracy Evaluation", The Transactions of the Institute of Electronics, Information and Communication Engineers D-II, vol. J88-D-II, No. 11, pp. 2200-2209, 2005 along with partial translation.

(Continued)

*Primary Examiner* — Bhavesh Mehta
*Assistant Examiner* — Feng Niu
(74) *Attorney, Agent, or Firm* — Wenderoth, Lind & Ponack, L.L.P.

(57) ABSTRACT

An image processing device that, even when a degradation model differs from a real degradation process of an obtained low-resolution image, generates a high-resolution image while restricting noises from occurring due to differences between the degradation model and the real degradation process. The image processing device includes: an enlargement interpolation unit generating a first high-resolution image that is higher in resolution than the low-resolution image; a super resolution processing unit generating, from the low-resolution image, a second high-resolution image; a feature generating unit generating features by using the low-resolution image; a difference calculating unit calculating difference values between values of pixels; an adjustment unit calculating corrected difference values by correcting the difference values by using the features; and a combination unit generating a third high-resolution image by adding corrected difference values to values of corresponding pixels in the first high-resolution image.

5 Claims, 9 Drawing Sheets

(56) References Cited

U.S. PATENT DOCUMENTS

2010/0054595 A1* 3/2010 Demandolx et al. .......... 382/170
2010/0322536 A1 12/2010 Tezuka

FOREIGN PATENT DOCUMENTS

| | | |
|---|---|---|
| JP | 2006-222493 | 8/2006 |
| JP | 2009-093442 | 4/2009 |
| JP | 2009-217658 | 9/2009 |
| JP | 2010-63088 | 3/2010 |
| WO | 2009/078437 | 6/2009 |
| WO | 2010/073582 | 7/2010 |

OTHER PUBLICATIONS

Sina Farsiu et al., "Fast and Robust Multiframe Super Resolution", IEEE Transactions on Image Processing, vol. 13, No. 10, Oct. 2004.

H. Kodera, "Differentiation in $R'''$", Meikai Enshu : Bibun Sekibun, Clear Exercises: Calculus, Kyoritsu Shuppan Co., Ltd., 1984, ch. 4, pp. 108-109.

K. Tamechika, "What is grad?", Rikeinara shitte okitai: Butsuri no kihon noto (Butsuri sugaku-hen) // Science Worth Knowing: Basic Physics Notes (Physical Mathematics Compilation), Kadokawa Corporation, 2006 ch. 5, sec. 3, pp. 150-152.

* cited by examiner

IMAGE PROCESSING DEVICE AND IMAGE PROCESSING METHOD GENERATING A HIGH-RESOLUTION IMAGE FROM A LOW-RESOLUTION IMAGE

BACKGROUND OF INVENTION

1. Technical Field

The present invention relates to an image processing technology for generating a high-resolution image from a low-resolution image.

2. Background Art

As a method for generating a high-resolution image from a low-resolution image, the super resolution technology has been proposed. For example, Non-Patent Literature 1, discloses a representative method of the super resolution technology. According to Non-Patent Literature 1, Equation 1 shown below is defined to represent relation between a plurality of low-resolution images and a high-resolution image, and the high-resolution image is generated by solving the Equation 1. To solve Equation 1, iterative processing using the gradient method or the like is performed, and the calculation is repeatedly performed until the error becomes constant.

$$I = \frac{1}{\sigma^2} \sum_{i=0}^{N_{l-1}} [b(x_i, y_i)^T \cdot h - f_i]^2 + a\|C^T \cdot h\|^2 \quad \text{(Equation 1)}$$

In the above equation, h is a vector representation of a high-resolution image, σ is a noise deviation of an observed value, b(xi, yi) is a vector representation of a PSF (Point Spread Function) kernel corresponding to a position (xi, yi), C is a matrix representing prior information of the high-resolution image, and α is a constraint parameter representing the strength of the constraint. Also, $N_l$ is the total number of pixels constituting a plurality of low-resolution images.

In conventional super resolution technologies, based on an assumption that a low-resolution image is a result of a high-resolution image having been degraded for some reason, the relation between a target high-resolution image and a low-resolution image is described in an equation, and the target high-resolution image is obtained by solving the equation. In obtaining an excellent high-resolution image, the equation as a degradation model plays a vital role, and how to create a degradation model of a low-resolution image based on an assumed degradation process is a key to the super resolution technology.

When the degradation model differs from the real degradation process of the low-resolution image, a noise is included in the obtained high-resolution image due to the difference between the degradation model and the real degradation process. Non-Patent Literature 2 discloses a super resolution technology that enhances the robustness by adding a member representing a system noise into the degradation model, other than the members representing noises occurring in the process of inputting the image such as the PSF and the like. According to the technology of Non-Patent Literature 2, a degradation model such as Equation 2 is defined, and a high-resolution image is generated by solving this equation.

$$Y_k = D_k H_k^{cam} F_k H_k^{atm} X + V_k$$

$$k=1, \ldots, N \quad \text{(Equation 2)}$$

In Equation 2, X is an input image, Hatm is an atmospheric blur, Fk is a degradation caused by A/D conversion, Hcam is a camera blur, Dk is a degradation caused by downsampling, and Vk is a system noise. In Equation 2, the degradation including the system noise is modeled. Thus the equation provides robustness with regard to noises other than the noises of the regular image degradation.

CITATION LIST

Non-Patent Literature

Non-Patent Literature 1
  Masayuki Tanaka and Masatoshi Okutomi, Sai-kousei-gata chou-kaizou-shori no kousoku-ka arugorizumu to sono seido-hyouka (A fast algorithm for reconstruction-based superresolution and evaluation of its accuracy), IEICE Transactions D, Vol. J88-D2, No. 11, pp. 2200-2209, 2005

Non-Patent Literature 2
  Sina Farsiu et al., Fast and robust multiframe super resolution, IEEE Transactions on Image Processing, vol. 13, no. 10, October 2004

SUMMARY OF INVENTION

However, in the case where, for example, an attempt is made to apply the super resolution to images that are provided by TV broadcasting, in practice it is impossible to assume the degradation model for each of a vast number of broadcast programs. When the technology disclosed in Non-Patent Literature 1 is used to perform the super resolution process with a degradation model prepared in advance, the high-resolution image obtained thereby includes a noise, producing an undesirable result. Also, applying the technology disclosed in Non-Patent Literature 2 has a problem that although robustness is provided to a certain extent, since the iterative processing is embedded in Equation 2 to secure the robustness, a large amount of calculation is required.

It is therefore an object of the present invention to provide an image processing device, an image processing method, a computer program for image processing, and a recording medium that, even when a degradation model differs from a real degradation process of an obtained low-resolution image, generate a high-resolution image while restricting noises from occurring due to differences between the degradation model and the real degradation process.

The above object is fulfilled by an image processing device for generating a high-resolution image from a low-resolution image, comprising: an obtaining unit configured to obtain the low-resolution image; an enlargement interpolation unit configured to generate a first high-resolution image that is higher in resolution than the low-resolution image, by performing an enlargement interpolation on the obtained low-resolution image; a super resolution processing unit configured to generate, from the low-resolution image, a second high-resolution image that is equal in resolution to the first high-resolution image, by tracing back a process through which an image is assumed to be degraded in resolution, the process being represented by a degradation model; a feature generating unit configured to generate a feature for each of a plurality of pixels constituting the first high-resolution image by using the low-resolution image; a difference calculating unit configured to calculate, for each of the plurality of pixels constituting the first high-resolution image, a difference value between a value of that pixel and a value of a corresponding pixel in the second high-resolution image; an adjustment unit configured to calculate a corrected difference value by correcting the calculated difference value by using the generated feature; and a combination unit configured to generate a third high-resolution image by adding corrected difference values calculated by the adjustment unit to values of corresponding pixels in the first high-resolution image.

As described above, the image processing device of the present invention causes the enlargement interpolation unit and the super resolution processing unit to perform different enlargement processes on the low-resolution image, generate features corresponding to the pixels constituting the first high-resolution image from the low-resolution image, and corrects the difference values representing differences between values of pixels constituting the first high-resolution image and the second high-resolution image, by using the generated features. The difference values representing differences between the first high-resolution image and the second high-resolution image include noise components that have occurred in the super resolution process. Accordingly, by correcting the difference values by using the features that have been generated based on the low-resolution image, and adding corrected difference values, which are obtained by the correction, to the first high-resolution image, it is possible to restrict noises that can be easily perceived.

In this way, the present invention produces an advantageous effect that, when the degradation model used in the super resolution process differs from the real degradation process of the obtained low-resolution image, it is possible to restrict noises from occurring and obtain a visually excellent high-resolution image.

The image processing device of the present invention can be used effectively in a device for generating a high-resolution image from a low-resolution image, such as a display device that generates a high-resolution image from a low-resolution image in compliance with the resolution of the display device, an image output device such as a printer for outputting a result of enlarging a low-resolution image, and a video shooting device that generates a still image by enlarging one of a plurality of images constituting a video.

BRIEF DESCRIPTION OF DRAWINGS

FIG. 9A illustrates a first specific example of the relationship between the gradient and the gain β; and FIG. 9B illustrates a second specific example of the relationship between the gradient and the gain β.

DETAILED DESCRIPTION OF INVENTION

Figure 1:
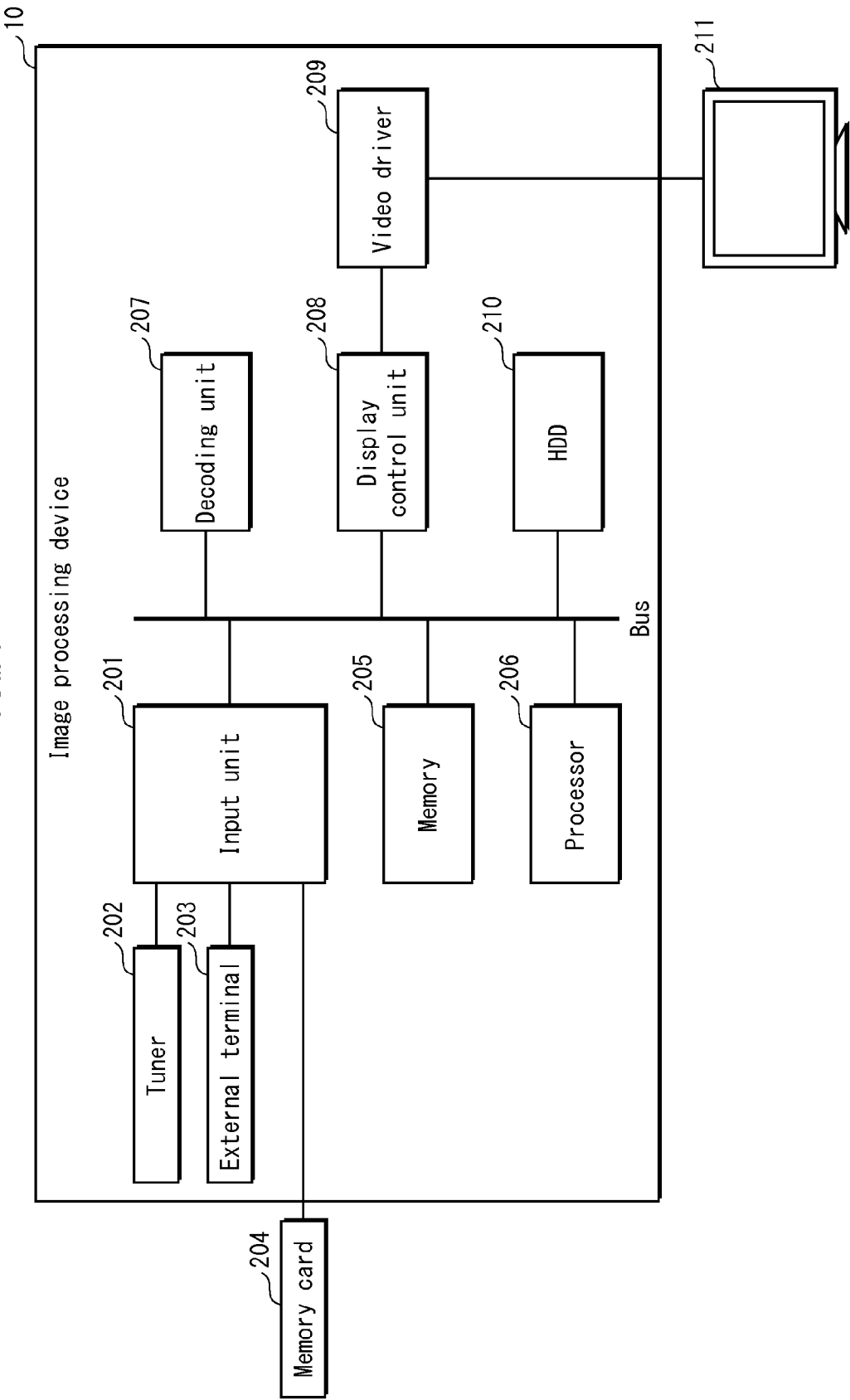
FIG. 1 is a block diagram illustrating the structure of the image processing device 10 as one embodiment of the present invention.

According to one aspect of the present invention, there is provided an image processing device for generating a high-resolution image from a low-resolution image, comprising: an obtaining unit configured to obtain the low-resolution image; an enlargement interpolation unit configured to generate a first high-resolution image that is higher in resolution than the low-resolution image, by performing an enlargement interpolation on the obtained low-resolution image; a super resolution processing unit configured to generate, from the low-resolution image, a second high-resolution image that is equal in resolution to the first high-resolution image, by tracing back a process through which an image is assumed to be degraded in resolution, the process being represented by a degradation model; a feature generating unit configured to generate a feature for each of a plurality of pixels constituting the first high-resolution image by using the low-resolution image; a difference calculating unit configured to calculate, for each of the plurality of pixels constituting the first high-resolution image, a difference value between a value of that pixel and a value of a corresponding pixel in the second high-resolution image; an adjustment unit configured to calculate a corrected difference value by correcting the calculated difference value by using the generated feature; and a combination unit configured to generate a third high-resolution image by adding corrected difference values calculated by the adjustment unit to values of corresponding pixels in the first high-resolution image.

In the above-described image processing device, the feature generating unit may generate, as the feature, gradient information indicating a gradient of a value of a pixel in an image area in the low-resolution image corresponding to peripheral pixels of each of the plurality of pixels constituting the first high-resolution image, and the adjustment unit may correct the calculated difference value by using the generated gradient information.

In the above-described image processing device, the adjustment unit may calculate a gain that increases or decreases depending on the gradient information, and calculate the corrected difference value by multiplying the calculated gain by the difference value.

In the above-described image processing device, the feature analyzing unit may generate, as the feature, a permissible range from an image area in the low-resolution image corresponding to peripheral pixels of each of the plurality of pixels constituting the first high-resolution image, the permissible range being a range of values that can be taken by that pixel, and the adjustment unit may correct the calculated difference value for each pixel in the second high-resolution image that has a value exceeding the permissible range.

According to another aspect of the present invention, there is provided an image processing method for use in an image processing device for generating a high-resolution image from a low-resolution image, comprising: an obtaining step of obtaining the low-resolution image; an enlargement interpolation step of generating a first high-resolution image that is higher in resolution than the low-resolution image, by performing an enlargement interpolation on the obtained low-resolution image; a super resolution processing step of generating, from the low-resolution image, a second high-resolution image that is equal in resolution to the first high-resolution image, by tracing back a process through which an image is assumed to be degraded in resolution, the process being represented by a degradation model; a feature generating step of generating a feature for each of a plurality of pixels constituting the first high-resolution image by using the low-resolution image; a difference calculating step of calculating, for each of the plurality of pixels constituting the first high-resolution image, a difference value between a value of that pixel and a value of a corresponding pixel in the second high-resolution image; an adjustment step of calculating a corrected difference value by correcting the calculated difference value by using the generated feature; and a combination step of generating a third high-resolution image by adding corrected difference values calculated by the adjustment unit to values of corresponding pixels in the first high-resolution image.

According to a still another aspect of the present invention, there is provided a computer program for image processing for use in an image processing device for generating a high-resolution image from a low-resolution image, the computer program causing a computer to execute: an obtaining step of obtaining the low-resolution image; an enlargement interpolation step of generating a first high-resolution image that is higher in resolution than the low-resolution image, by performing an enlargement interpolation on the obtained low-resolution image; a super resolution processing step of generating, from the low-resolution image, a second high-resolution image that is equal in resolution to the first high-resolution image, by tracing back a process through which an image is assumed to be degraded in resolution, the process being represented by a degradation model; a feature generating step of generating a feature for each of a plurality of pixels constituting the first high-resolution image by using the low-resolution image; a difference calculating step of calculating, for each of the plurality of pixels constituting the first high-resolution image, a difference value between a value of that pixel and a value of a corresponding pixel in the second high-resolution image; an adjustment step of calculating a corrected difference value by correcting the calculated difference value by using the generated feature; and a combination step of generating a third high-resolution image by adding corrected difference values calculated by the adjustment unit to values of corresponding pixels in the first high-resolution image.

According to a further aspect of the present invention, there is provided a computer-readable recording medium storing a computer program for image processing for use in an image processing device for generating a high-resolution image from a low-resolution image, the computer program causing a computer to execute: an obtaining step of obtaining the low-resolution image; an enlargement interpolation step of generating a first high-resolution image that is higher in resolution than the low-resolution image, by performing an enlargement interpolation on the obtained low-resolution image; a super resolution processing step of generating, from the low-resolution image, a second high-resolution image that is equal in resolution to the first high-resolution image, by tracing back a process through which an image is assumed to be degraded in resolution, the process being represented by a degradation model; a feature generating step of generating a feature for each of a plurality of pixels constituting the first high-resolution image by using the low-resolution image; a difference calculating step of calculating, for each of the plurality of pixels constituting the first high-resolution image, a difference value between a value of that pixel and a value of a corresponding pixel in the second high-resolution image; an adjustment step of calculating a corrected difference value by correcting the calculated difference value by using the generated feature; and a combination step of generating a third high-resolution image by adding corrected difference values calculated by the adjustment unit to values of corresponding pixels in the first high-resolution image.

(Embodiment)

The following describes an image processing device 10 as one embodiment of the present invention with reference to the accompanying drawings.

1. Image Processing Device 10

As illustrated in FIG. 1, the image processing device 10 includes an input unit 201, a tuner 202, an external terminal 203, a memory 205, a processor 206, a decoding unit 207, a display control unit 208, a video driver 209, and a hard disk drive 210. The image processing device 10 is connected with a display device 211 that uses liquid crystal, plasma, CRT or the like. A memory card 204 is attachable to the image processing device 10.

The image processing device 10, which may be a hard disk recorder as one example, stores one or more broadcast programs received via the digital broadcasting, and plays back one of the stored programs on the display device 211 as instructed by the user. The display device 211 is, as one example, a large-scale television display having a high resolution for displaying the programs.

The tuner 202 extracts a TV signal from received broadcast waves, and outputs the extracted TV signal to the input unit 201. The TV signal includes image data. The external terminal 203 receives a video signal from another video playback device (not illustrated) such as a DVD playback device, and outputs the received video signal to the input unit 201. The video signal includes image data. The memory card 204 is, as one example, an SD card and stores videos and/or still images.

The input unit 201 receives image data (hereinafter referred to as "low-resolution image") from the tuner 202, external terminal 203, or memory card 204. Here, the low-resolution image is an image whose resolution is lower than the resolution of the display device 211. The memory 205 is used as a primary storage of the image processing device 10, and is composed of a DRAM or the like. The processor 206 controls the image processing device 10 as a whole. The hard disk drive 210 is a secondary storage for storing images and the like, and stores low-resolution images input from the input unit 201.

When a low-resolution image received by the input unit 201 is a compressed image, or when a low-resolution image stored in the hard disk drive 210 is a compressed image, the decoding unit 207 decodes the compressed image. Decoded images are sent to the display control unit 208 directly or via the memory 205. The display control unit 208 converts a received image into an image having a resolution that is supported by the display device 211 (hereinafter the image is referred to as a "third high-resolution image"), and outputs the third high-resolution image to the video driver 209. The video driver 209 outputs the third high-resolution image to the display device 211 and controls display of the third high-resolution image on the display device 211.

Note that, according to the above description, the image processing device 10 includes the tuner 202. However, the present invention is not limited to this. The image processing device 10 may not include the tuner 202, but may be connected with a digital broadcast receiving device that includes a tuner.

Figure 2:
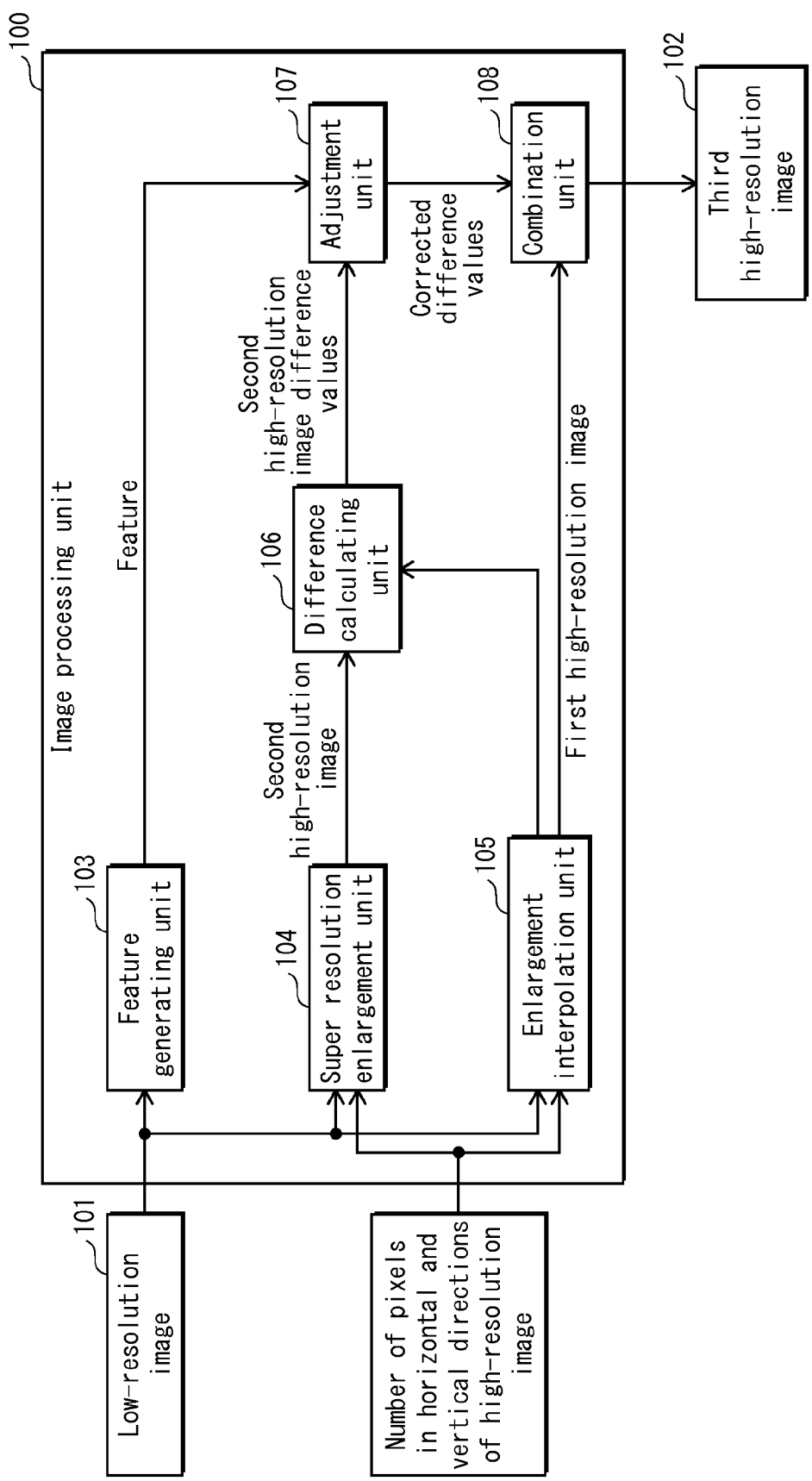
FIG. 2 is a block diagram illustrating the structure of the image processing unit 100.

The display control unit 208 includes an image processing unit 100 illustrated in FIG. 2 for generating the third high-resolution image by converting a received low-resolution image to have a resolution that matches the resolution of the display device 211.

The display control unit 208 extracts, from a decoded low-resolution image, a value in XS indicating the number of pixels in the horizontal direction and a value in YS indicating the number of pixels in the vertical direction of the low-resolution image. The display control unit 208 also receives, from the video driver 209, a value outXS indicating the number of pixels in the horizontal direction and a value outYS indicating the number of pixels in the vertical direction of the third high-resolution image to be displayed on the display device 211.

The image processing unit 100 is implemented as hardware. However, not limited to this, the image processing unit 100 may be implemented as software processing of the processor 206. Note that, in either case of implementation, the image processing unit 100 can be used, for example, to re-encode a generated third high-resolution image and write it back onto the hard disk drive 210.

2. Image Processing Unit 100

The image processing unit 100, as illustrated in FIG. 2, includes a feature generating unit 103, a super resolution enlargement unit 104, an enlargement interpolation unit 105, a difference calculating unit 106, an adjustment unit 107, and a combination unit 108.

The image processing unit 100 receives a low-resolution image.

The enlargement interpolation unit 105 generates a first high-resolution image that is higher in resolution than the received low-resolution image, by performing an enlargement interpolation on the received low-resolution image. The super resolution enlargement unit 104 generates, from the received low-resolution image, a second high-resolution image that is equal in resolution to the first high-resolution image, by tracing back a process through which an image is assumed to be degraded in resolution, the process being represented by a degradation model. The feature generating unit 103 generates a feature for each of a plurality of pixels constituting the first high-resolution image, based on the received low-resolution image. The difference calculating unit 106 calculates, for each of the plurality of pixels constituting the first high-resolution image, a difference value between a value of that pixel and a value of a corresponding pixel in the second high-resolution image. The adjustment unit 107 calculates a corrected difference value by correcting each of the calculated difference values based on the feature generated as described above. The combination unit 108 generates the third high-resolution image by adding the corrected difference values respectively to the values of the pixels constituting the first high-resolution image, and outputs the generated third high-resolution image.

The image processing unit 100 receives the value in XS indicating the number of pixels in the horizontal direction and the value in YS indicating the number of pixels in the vertical direction of the low-resolution image, and receives the value outXS indicating the number of pixels in the horizontal direction and the value outYS indicating the number of pixels in the vertical direction of the high-resolution image.

(1) Enlargement Interpolation Unit 105

The enlargement interpolation unit 105 generates the first high-resolution image as follows. Note that the first high-resolution image and the third high-resolution image to be displayed on the display device 211 have the same resolution, number of pixels in horizontal direction and number of pixels in vertical direction.

The enlargement interpolation unit 105 receives the low-resolution image. The enlargement interpolation unit 105 also receives the value in XS indicating the number of pixels in the horizontal direction and the value in YS indicating the number of pixels in the vertical direction of the low-resolution image, and receives the value outXS indicating the number of pixels in the horizontal direction and the value outYS indicating the number of pixels in the vertical direction of the third high-resolution image.

Subsequently, the enlargement interpolation unit 105 calculates an interpolation interval dx in the horizontal direction and an interpolation interval dy in the vertical direction, based on the following Equations 3 and 4, using the values in XS, in YS, outXS, and outYS each indicating the number of pixels.

Interpolation interval $dx$ in the horizontal direction=in $DX/outDX$  (Equation 3)

Interpolation interval $dy$ in the vertical direction=in $DY/outDY$  (Equation 4)

The interpolation interval dx in the horizontal direction and the interpolation interval dy in the vertical direction, calculated as described above, define the positions of the pixels constituting the first high-resolution image. That is to say, in the first high-resolution image, each pixel is arranged at a position that is an integer multiple of the horizontal interpolation interval dx in the horizontal direction, and is arranged at a position that is an integer multiple of the vertical interpolation interval dy in the vertical direction.

Note that since the low-resolution image is lower in resolution than the third high-resolution image, values dx and dy are each smaller than 1.

Subsequently, the enlargement interpolation unit 105 repeatedly performs the following processes (a) to (c) for each of all the pixels to be arranged in the first high-resolution image.

(a) With regard to the position (referred to as "central position") of one pixel (referred to as "central pixel") to be arranged in the first high-resolution image, the enlargement interpolation unit 105 selects, as one example, 36 pixels (referred to as "peripheral pixels") arranged in a matrix of six rows and six columns, from among a plurality of pixels constituting the low-resolution image such that the central position is arranged approximately at the center of the peripheral pixels, and obtains pixel values of the selected peripheral pixels.

Figure 3:
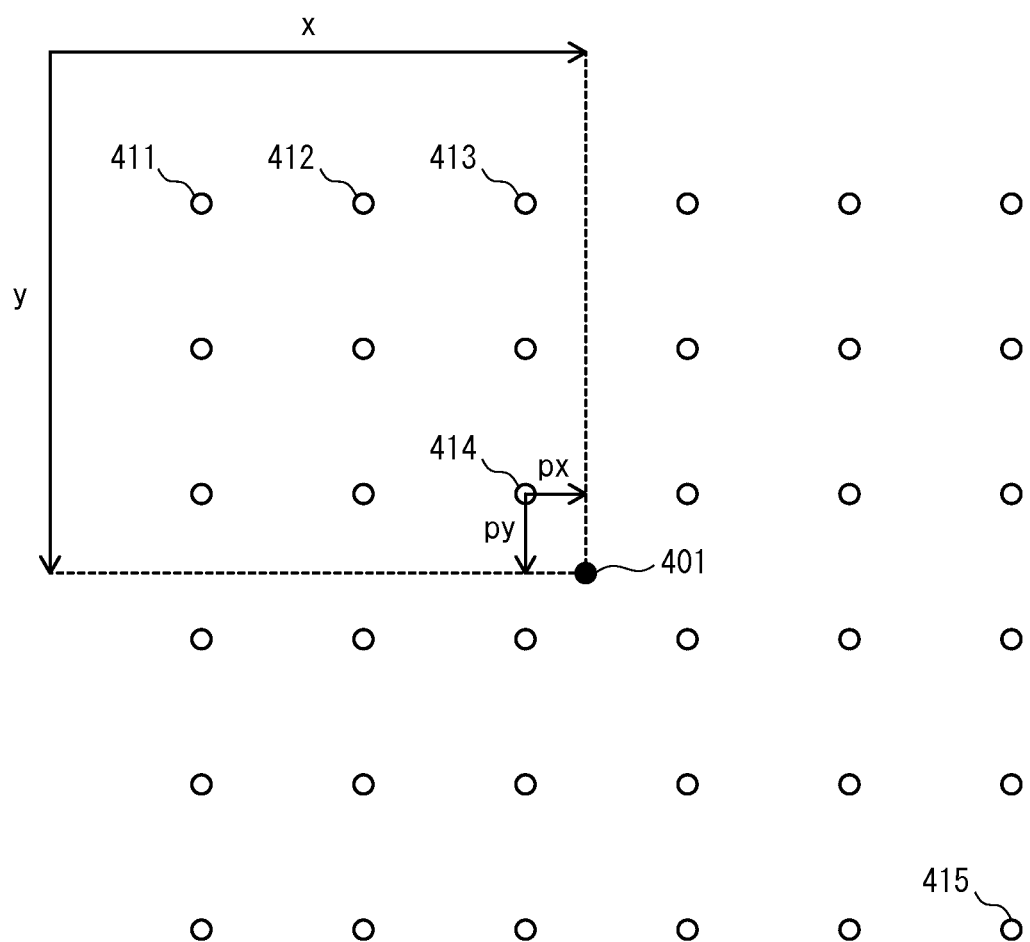
FIG. 3 illustrates one example of pixels to be arranged in the first high-resolution image, the pixels including one central pixel 401 and 36 peripheral pixels 411, 412, 413, . . . , 414, . . . , 415.

FIG. 3 illustrates one example of pixels arranged, the pixels including one central pixel 401 of the first high-resolution image and 36 peripheral pixels 411, 412, 413, ..., 414, ..., 415 selected from the low-resolution image. As illustrated in FIG. 3, the central pixel 401 is placed approximately at the center of the peripheral pixels 411, 412, 413, ..., 414, ..., 415 arranged as a matrix of six rows and six columns.

In FIG. 3, the coordinates (x, y) of the central pixel 401 are, for example, (3.4, 3.5).

(b) Subsequently, respective decimal parts px and py of the x and y coordinates of the central position are calculated.

As illustrated in FIG. 3, decimal parts px and py are components of the distance between the central pixel 401 and a peripheral pixel 414 that is nearest to the central pixel 401, in the x-axis and y-axis directions, respectively. Note that, in FIG. 3, px=0.4 and py=0.5, as one example.

(c) Subsequently, by using the obtained pixel values of the peripheral pixels and decimal parts px and py, the pixel value of the central pixel at the central position is calculated by the enlargement interpolation method, and the calculated pixel value is stored at the central position of the first high-resolution image.

The enlargement interpolation method for use may be the bilinear method, bicubic convolution method, or Lanczos method that are conventionally known techniques. For example, in the bicubic convolution method, the interpolation calculation is performed based on 4×4 pixels located around a point (x, y).

As one example, a pixel value "out" of the central pixel is calculated based on the following Equation 5.

$$\text{out} = \frac{\sum_{l=1}^{4}\sum_{m=1}^{4}(I(l, m) \times wx_l \times wy_m)}{\sum_{l=1}^{4}\sum_{m=1}^{4}(wx_l \times wy_m)} \quad \text{(Equation 5)}$$

In the above equation, out is an output pixel value, I(l,m) is pixel values of 4×4 pixels at position (l,m), wxl is a weight coefficient at position/in the x direction, and wym is a weight coefficient at position m in the y direction. Note that each of the weight coefficients is represented by the following Equation 6 in the case of the bicubic interpolation, where d is the distance from the interpolation pixel position represented by px, py in the x or y direction.

$$w = \begin{cases} 1 - 2d^2 + d^3 & d \leq 1.0 \\ 4 - 8d + 5d^2 - d^3 & 1.0 < d \leq 2.0 \\ 0 & d > 2.0 \end{cases} \quad \text{(Equation 6)}$$

Also, w is represented by the following Equation 7 in the case of the Lanczos method.

$$w = \begin{cases} \dfrac{\sin(d\pi)}{d\pi} \dfrac{\sin\left(\frac{x}{2}\pi\right)}{\pi\frac{d}{2}} & d < 2 \\ 0 & d \geq 2 \end{cases} \quad \text{(Equation 7)}$$

(2) Super Resolution Enlargement Unit 104

Let Y denote a low-resolution image that is input, and X an unknown, correct second high-resolution image, and then input image Y can be considered to be a result of degradation represented by degradation function H. The following Equation 8 represents this relationship.

$$Y = HX \quad \text{(Equation 8)}$$

Note that the degradation function H includes a reduction process for converting the second high-resolution image into a low-resolution image, a PSF (Point Spread Function), etc.

The super resolution enlargement unit 104 performs a process for obtaining X (namely the second high-resolution image) by performing a reverse calculation of Equation 8.

Note that noises other than the degradation and constraint condition V may be added to Equation 8, as defined by the following Equation 9.

$$Y = HX + V \quad \text{(Equation 9)}$$

In the reverse calculation of this equation, in general, a second high-resolution image X is temporarily determined and Y' is calculated based on Equation 8 or 9, and these calculations are repeatedly performed until the difference between the result Y' and the input image Y becomes smaller than a threshold value. As another method, X may be calculated by using a plurality of frames constituting a video that is input as the low-resolution image. Further, as a simple method, X may be obtained by deconvolution.

In any case, the super resolution enlargement process of the present embodiment includes estimating degradation of an image by a predetermined method, obtaining the reverse function thereof, and generating the second high-resolution image.

In the following, a pixel position that is obtained by replacing a pixel position in the first and second high-resolution images, which are respectively generated by the enlargement interpolation unit 105 and the super resolution enlargement unit 104, with a pixel position (x, y in FIG. 3) in a low-resolution image, is referred to as a "phase".

If the first high-resolution image output from the enlargement interpolation unit 105 and the second high-resolution image output from the super resolution enlargement unit 104 differ in phase, corresponding pixel values of the two high-resolution images for a same position are shifted from each other, and the subsequent processes performed with the difference in phase produce incorrect results. Thus the outputs of the enlargement interpolation unit 105 and the super resolution enlargement unit 104 need to be made to coincide with each other in phase. To make the outputs coincide with each other in phase, pixel positions (interpolation positions x, y, dx, dy) in the first high-resolution image output from the enlargement interpolation unit 105 are made to be the same as pixel positions of corresponding pixels in the second high-resolution image output from the super resolution enlargement unit 104.

(3) Feature Generating Unit 103

It is important to estimate the above-mentioned degradation function H correctly since the quality of the obtained second high-resolution image changes depending on how the degradation function H is estimated. Note that in the broadcasting or the like, it is difficult to estimate the degradation function H correctly. An unintended noise component or the like occurs if the function H is estimated inappropriately. In the following process of the present embodiment, such unintended noise components are restricted.

The feature generating unit 103 inputs a low-resolution image, calculates features corresponding to pixels constituting a first high-resolution image, and outputs the calculated feature values. Accordingly, the features, which are output as a result of the feature analysis by the feature generating unit 103, coincide in phase with the first and second high-resolution images output from the enlargement interpolation unit 105 and the super resolution enlargement unit 104, respectively.

The feature generating unit 103 repeatedly performs the following processes (a) to (b) for each of all the pixels to be arranged in the first high-resolution image.

(a) With regard to the position (referred to as "attention position") of one pixel (referred to as "attention pixel") to be arranged in the first high-resolution image, the feature generating unit 103 selects, as one example, N×M pixels arranged in a matrix of horizontal N pixels and vertical M pixels (an area composed of these pixels is referred to as an "area S"), from among a plurality of pixels constituting the low-resolution image such that the attention position is arranged approximately at the center of the area S, and obtains pixel values of the selected peripheral pixels.

(b) The feature generating unit 103 calculates, as the features, the gradient and the permissible amplitude of the area S centered on the attention pixel.

Note that the area S is composed of N×M pixels centered on the interpolation phase (x, y) of the low-resolution image, and is composed of 2×2 pixels at the minimum. When the amount of processing and the accuracy of the features are taken into account, it is desirable that N and M are each in the range from 3 to 6 approximately.

(Calculation of Gradient of Area S)

The feature generating unit 103 calculates the gradient of the area S in accordance with //∇u// by regarding the pixel values in the area S as continuously changing values in the area S, not as discrete values in the area S, where u denotes a function of the gradient of the area S.

The //∇u// may be calculated based on the following Equation 10 or 11, for example.

$$\|\nabla u\| = \sqrt{\left(\frac{\partial u}{\partial x}\right)^2 + \left(\frac{\partial u}{\partial y}\right)^2} \quad \text{(Equation 10)}$$

$$\|\nabla u\| = \frac{\partial u}{\partial x} + \frac{\partial u}{\partial y}. \quad \text{(Equation 11)}$$

Alternatively, for a simplified calculation of //∇u//, the feature generating unit 103 may calculate a difference between the maximum value and the minimum value in the area S.

In any case, regardless of the method for use, the feature generating unit 103 calculates the gradient in the area S, and outputs the calculated gradient as one of the features.

(Calculation of Permissible Amplitude)

The permissible amplitude indicates a permissible range for the attention pixel to change. The feature generating unit 103 calculates the permissible amplitude from the gradient in the area S or the like.

(i) Simple Method for Calculating Permissible Amplitude

The feature generating unit 103 calculates the maximum value in the area S as the maximum value of the permissible amplitude, and calculates the minimum value in the area S as the minimum value of the permissible amplitude.

(ii) Other Methods for Calculating Permissible Amplitude

Here, other methods for calculating the permissible amplitude are described.

(ii-1) First Example

The first example for calculating the permissible amplitude is explained with reference to FIGS. 4-6.

Figure 4:
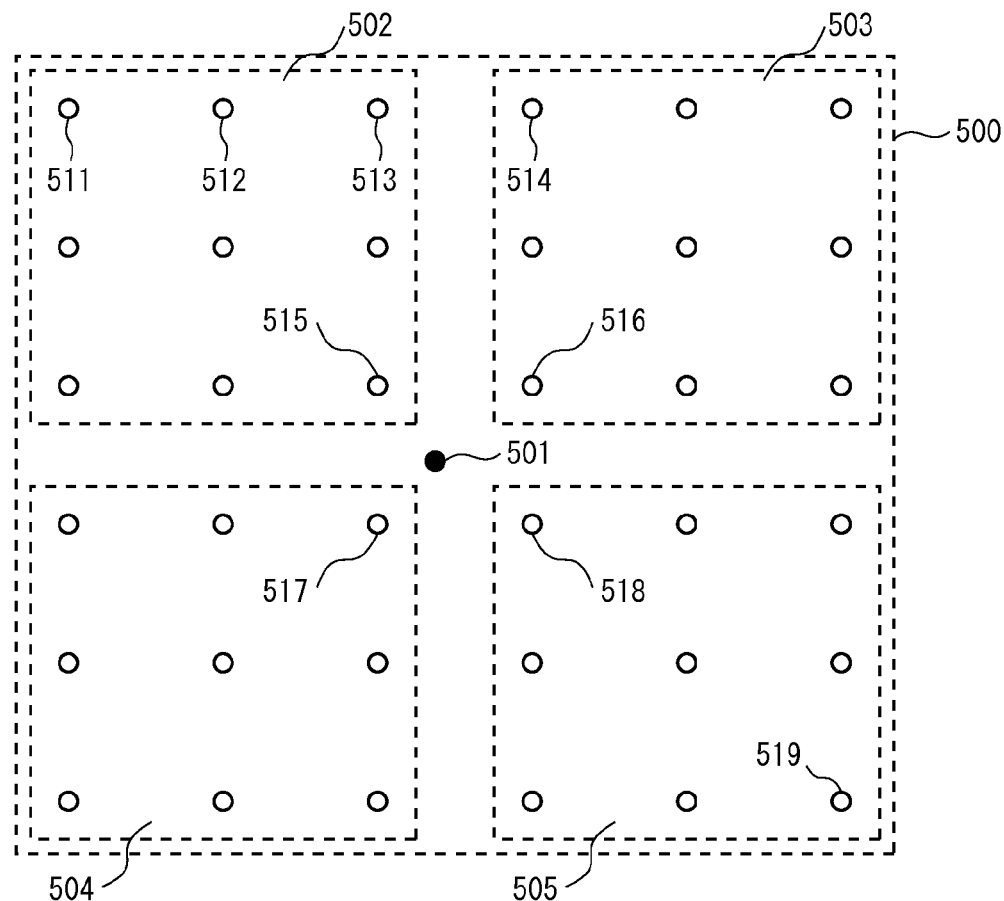
FIG. 4 illustrates four areas 502, 503, 504 and 505 centering on the pixel 501.

In FIG. 4, a pixel 501 is a pixel (attention pixel) to be arranged in the first high-resolution image, the pixel (attention pixel) being the target of the calculation of the permissible amplitude. As illustrated in FIG. 4, a total of 36 pixels 511, 512, 513, 514, . . . , 515, 516, 517, 518, . . . , 519 are arranged in a matrix of horizontal 6 pixels and vertical 6 pixels selected from among a plurality of pixels constituting the low-resolution image such that the pixel 501 is arranged approximately at the center of these pixels, and the total of 36 pixels 511, 512, 513, 514, . . . , 515, 516, 517, 518, . . . , 519 constitute an area S 500.

The feature generating unit 103 selects the total of 36 pixels 511, 512, 513, 514, . . . , 519 from the low-resolution image to be included in the area S 500 such that the attention pixel, namely the pixel 501 is arranged approximately at the center of the 36 pixels. Next, the feature generating unit 103 divides the area S 500 into four areas 502, 503, 504 and 505. Each of the areas 502, 503, 504 and 505 includes a total of nine pixels of the low-resolution image arranged in a matrix of horizontal 3 pixels and vertical 3 pixels. The area 502 is adjacent to the upper left side of the pixel 501, the area 503 is adjacent to the upper right side of the pixel 501, the area 504 is adjacent to the lower left side of the pixel 501, and the area 505 is adjacent to the lower right side of the pixel 501. Note that a pixel 515 is arranged at a position nearest to the pixel 501 among the nine pixels of the low-resolution image included in the area 502, a pixel 516 is arranged at a position nearest to the pixel 501 among the nine pixels of the low-resolution image included in the area 503, a pixel 517 is arranged at a position nearest to the pixel 501 among the nine pixels of the low-resolution image included in the area 504, and a pixel 518 is arranged at a position nearest to the pixel 501 among the nine pixels of the low-resolution image included in the area 505.

The feature generating unit 103 selects a pixel having the maximum pixel value among the nine pixels of the low-resolution image included in the area 502, and recognizes the pixel value of the selected pixel as MAX1. Also, the feature generating unit 103 selects a pixel having the minimum pixel value among the nine pixels of the low-resolution image included in the area 502, and recognizes the pixel value of the selected pixel as MIN1. In this way, the feature generating unit 103 calculates a pair of the maximum value MAX1 and the minimum value MIN1 from the area 502. Similarly, the feature generating unit 103 calculates a pair of maximum value MAX2 and minimum value MIN2 from the area 503, a pair of maximum value MAX3 and minimum value MIN3 from the area 504, and a pair of maximum value MAX4 and minimum value MIN4 from the area 505.

It is assumed here that the pair of the maximum value MAX1 and the minimum value MIN1 is representative of the area 502, and that the maximum value MAX1 and the minimum value MIN1 are arranged at the same position as the pixel 515 in the area 502. Similarly, it is assumed that the maximum value MAX2 and the minimum value MIN2 are arranged at the same position as the pixel 516 in the area 503, the maximum value MAX3 and the minimum value MIN3 are arranged at the same position as the pixel 517 in the area 504, and the maximum value MAX4 and the minimum value MIN4 are arranged at the same position as the pixel 518 in the area 505.

Figure 5:
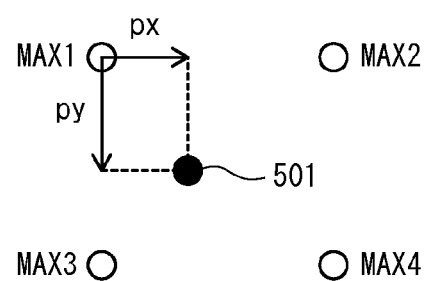
FIG. 5 illustrates the positional relationship among the maximum values MAX1, MAX2, MAX3, MAX4, and the attention pixel 501.
Figure 6:
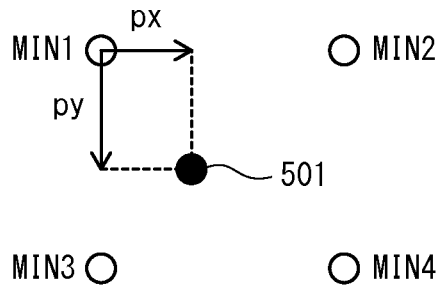
FIG. 6 illustrates the positional relationship among the minimum values MIN1, MIN2, MIN3, MIN4, and the attention pixel 501.

Based on the above assumption, FIG. 5 illustrates the positional relationship among the maximum values MAX1, MAX2, MAX3, MAX4, and the pixel 501, and FIG. 6 illustrates the positional relationship among the minimum values MIN1, MIN2, MIN3, MIN4, and the pixel 501.

As illustrated in FIG. 5 as one example, the feature generating unit 103 calculates the maximum value MAX of the permissible amplitude of the attention pixel 501 by linearly interpolating MAX1, MAX2, MAX3 and MAX4 by using the positional relationship among the maximum values MAX1, MAX2, MAX3, MAX4, and the attention pixel 501, and the decimal parts px and py of the interpolation phase of the attention pixel 501.

Also, as illustrated in FIG. 6 as one example, the feature generating unit 103 calculates the minimum value MIN of the permissible amplitude of the attention pixel 501 by linearly interpolating MIN1, MIN2, MIN3 and MIN4 by using the positional relationship among the minimum values MIN1, MIN2, MIN3, MIN4, and the attention pixel 501, and the decimal parts px and py of the interpolation phase of the attention pixel 501.

As described above, the feature generating unit 103 calculates the maximum value MAX and the minimum value MIN of the permissible amplitude for each of all the pixels constituting the first high-resolution image.

(ii-2) Second Example

The second example for calculating the permissible amplitude is explained with reference to FIGS. 7-8.

In the second example for calculating the permissible amplitude, the feature generating unit 103 corrects the maximum value MAX and the minimum value MIN calculated by the aforementioned first example, based on the concave-up/down change of the pixel values in the area S.

Figure 7:
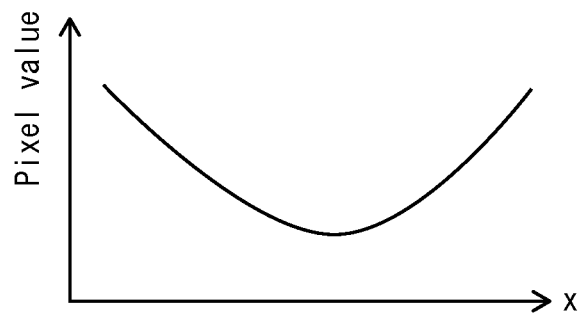
FIG. 7 illustrates a case where, the change along the x axis of the pixel values of a plurality of pixels arranged in the x-axis direction forms a concave-down shape in the area S.
Figure 8:
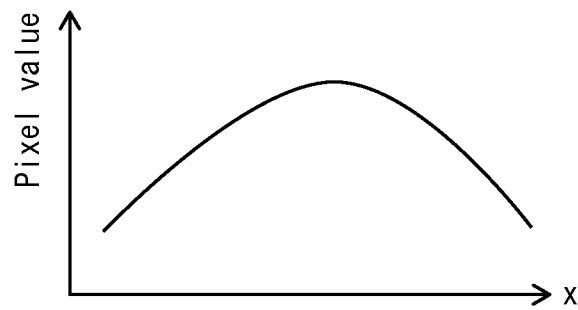
FIG. 8 illustrates a case where, the change along the x axis of the pixel values of the pixels arranged in the x-axis direction forms a concave-up shape in the area S.

FIGS. 7 and 8 illustrate examples of changes of pixel values in the area S in the x-axis direction. FIG. 7 illustrates a case where, the change along the x axis of the pixel values of a plurality of pixels arranged in the x-axis direction forms a concave-down shape in the area S. FIG. 8 illustrates a case where, the change along the x axis of the pixel values of the pixels arranged in the x-axis direction forms a concave-up shape in the area S. Note that although FIGS. 7 and 8 illustrate only changes of the pixel values in the x-axis direction for the sake of simplification, it may also be assumed that the pixel values of a plurality of pixels arranged in the y-axis direction change in a similar manner. It may also be assumed that, in the whole space of the area S, the change of pixel values of a plurality of pixels arranged in the area S forms a concave-down or concave-up shape.

The feature generating unit 103 judges whether, in the whole space of the area S, the change of pixel values of a plurality of pixels arranged in the area S forms a concave-down shape or a concave-up shape.

When it judges that the change of pixel values in the whole space of the area S forms a concave-down shape, the feature generating unit 103 calculates a corrected minimum value MIN' by multiplying a coefficient α, which is a value not greater than 1, by the minimum value MIN of the permissible amplitude calculated by the first example for calculating the permissible amplitude, based on the following Equation 12.

$$MIN' = \alpha \times MIN \quad \text{(Equation 12)}$$

Also, when it judges that the change of pixel values in the whole space of the area S forms a concave-up shape, the feature generating unit 103 calculates a corrected maximum value MAX' by multiplying a coefficient α, which is a value not smaller than 1, by the maximum value MAX of the permissible amplitude calculated by the first example for calculating the permissible amplitude, based on the following Equation 13.

$$MAX' = \alpha \times MAX \quad \text{(Equation 13)}$$

In this way, the permissible amplitude is adjusted in compliance with the features of the low-resolution image, by correcting MIN and MAX based on whether the change of pixel values in the whole space of the area S forms a concave-down shape or a concave-up shape. This makes it possible to, in the low-resolution image, increase the maximum value with regard to a portion where the change of pixel values forms a concave-up shape, and decrease the minimum value with regard to a portion where the change of pixel values forms a concave-down shape, thereby realizing restriction of the amplitude of the peripheral values around the attention pixel of the low-resolution image, exceeding the maximum and minimum values.

Note that the coefficient α is a function of the concave-down or concave-up shape in the area S, represented by the following Equation 14.

$$\alpha = f(u) \quad \text{(Equation 14)}$$

In the function f, α may be obtained from a result of applying Laplacian filter to the area S, for example. Also, a may be obtained from the ratio of each pixel value, which is the result of applying a low-pass filter to each pixel value in the area S, to said each pixel value in the area S.

More specifically, the coefficient α may be determined by multiplying an appropriate coefficient β by a result of applying Laplacian filter. In this case, a may become too great depending on the coefficient β or the pixel values. (Each pixel value may be a value in the range from 0 to 255. When the pixel values are normalized, each pixel value is represented by a value in the range from 0 to 1.0, where 0 indicates black and 1.0 indicates white.) When α becomes too great or too small, α is clipped by multiplying α by a clip value. The clip value may be in the range from 0.5 times to 1.5 times or in the range from 0.25 times to 1.75 times, for example. It should be noted here that the clip value is not limited to this range.

The coefficient α may be a ratio B/A, where A is a pixel value obtained as a result of applying a low-path filter, and B is each pixel value in small areas in the area S. Note that in this case, a clipping of the same level as the Laplacian filtering may be performed as well.

As described above, in the second example for calculating the permissible amplitude, corrected maximum value and minimum value are calculated as the permissible amplitude, based on the concave-up/down change of the pixel values in the area S.

(4) Difference Calculating Unit 106

The difference calculating unit 106 receives the first high-resolution image from the enlargement interpolation unit 105, and the second high-resolution image from the super resolution enlargement unit 104.

Next, the difference calculating unit 106 calculates a difference value between pixel values of corresponding pixels of the first and second high-resolution images, for each of the pixels constituting the first and second high-resolution images, based on Equation 13, and outputs the difference values obtained by the calculation to the adjustment unit 107.

$$\text{Difference value }(x,y) = (\text{pixel value of pixel }(x,y)\text{ in second high-resolution image}) - (\text{pixel value of pixel }(x,y)\text{ in first high-resolution image}) \quad \text{(Equation 15)}$$

Furthermore, the difference calculating unit 106 outputs the received second high-resolution image to the adjustment unit 107.

With the difference values calculated as described above, it is possible to extract a portion representing a change between the second high-resolution image output from the super resolution enlargement unit 104 and the first high-resolution image output from the enlargement interpolation unit 105. Noises that occur in the super resolution process are included in the difference values. Thus in the following process, the difference values are corrected to restrict the noises.

(5) Adjustment Unit 107

The adjustment unit 107 receives the second high-resolution image and all the calculated difference values (x,y) from the difference calculating unit 106, and receives the features from the feature generating unit 103. As described above, the feature of each of the pixels constituting the first high-resolution image is the gradient information, or the permissible amplitude, or a combination of the gradient information and the permissible amplitude.

Next, the adjustment unit 107 obtains a corrected difference value (x,y) by correcting a difference value (x,y) calculated by the difference calculating unit 106 for each of all the received difference values (x,y), based on the following Equation 16.

Corrected difference value (x,y)=difference value (x,y)×gain β    (Equation 16)

The adjustment unit 107 then outputs all of the calculated corrected difference values (x,y) to the combination unit 108.

The following describes the method for correcting the difference value (x,y) in detail.

(a) First Correction Method

The adjustment unit 107, as a first correction method, may correct the difference value by using the gradient information received as the feature from the feature generating unit 103. In the correction using the gradient information, the difference value is corrected based on the size of the gradient.

The adjustment unit 107 stores, in advance, a correspondence table (not illustrated) that indicates the relationship between the gradient and the gain β. The correspondence table includes a plurality of pieces of correspondence data which each include a gradient and a gain β. With this structure, each piece of correspondence data indicates the correspondence between the gradient and the gain β included therein, and when a gradient is specified, a gain β corresponding to the specified gradient can be used. The gain β is set approximately within the range from 0 times to 16 times.

The adjustment unit 107 obtains a gain β corresponding to a gradient indicated by the gradient information (the feature) by reading it from the correspondence table. When a gradient indicated by the gradient information is not present in the correspondence table, a gain β that corresponds to the gradient indicated by the gradient information may be calculated by linear interpolation by using the plurality of pieces of correspondence data included in the correspondence table.

Note that the adjustment unit 107 may not include the correspondence table, but may have a formula that represent the relationship between the gradient and the gain β, and calculate the gain β that corresponds to the gradient, in accordance with the formula.

In this way, the adjustment unit 107 obtains a gain β and calculates a corrected difference value by multiplying the obtained gain β by a difference value, as defined in Equation 16.

(First Specific Example of Relationship Between Gradient and Gain β)

Figure 9A:
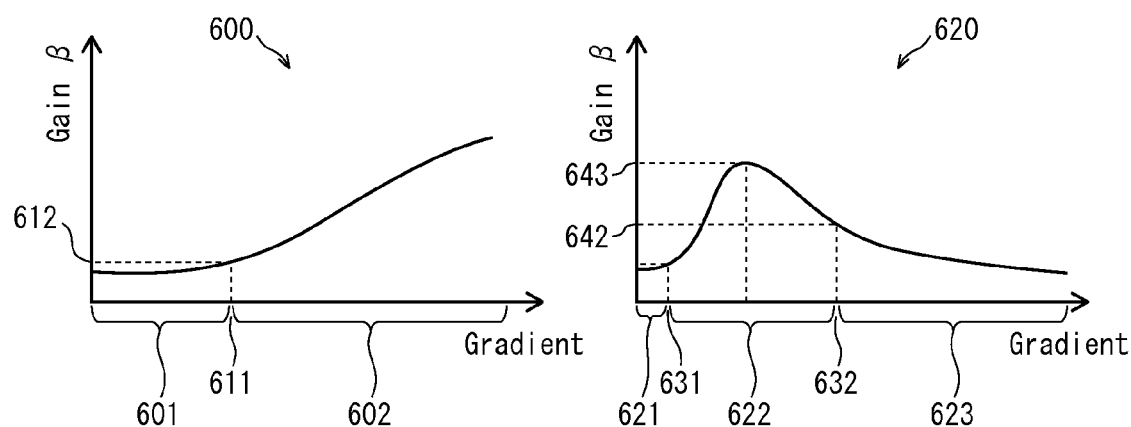
FIGS. 9A and 9B illustrate the relationship between the gradient and the gain β in the correspondence table included in the adjustment unit 107.

FIG. 9A illustrates a first specific example of the relationship between the gradient and the gain β in the correspondence table. A graph 600 illustrated in FIG. 9A represents the relationship between the gradient and the gain β, the horizontal axis representing the gradient, the vertical axis representing the gain. In the graph 600, in a range 601 where the gradient is smaller than a gradient value 611, the setting is made such that the gain β is smaller than a gain value 612 and is almost constant. On the other hand, in a range 602 where the gradient is greater than the gradient value 611, the setting is made such that the gain β is greater than the gain value 612 and becomes greater as the gradient becomes greater.

As described above, in the case illustrated in FIG. 9A, the gain β is set to be small in a range where the gradient is small, and in a range where the gradient is great, the gain β is set to increase as the gradient increases.

It is considered that, in a range with small gradient, for example, in the range 601 of the graph 600, the image has a fine texture, and in a range with great gradient, for example, in the range 602 of the graph 600, the image has an edge component.

By setting the relationship between the gradient and the gain β as illustrated in FIG. 9A, it is possible to correct the difference value for a fine texture by using a small gain β, namely correct the difference value by a very small amount, and on the other hand, to correct the difference value for an edge component such that the stronger the edge component is, the greater the used gain β is, namely, to correct only strong edge components. This makes it possible to enhance only edge components included in an image, without enhancing noise components included in small amplitudes in the image.

(Second Specific Example of Relationship Between Gradient and Gain β)

Figure 9B:
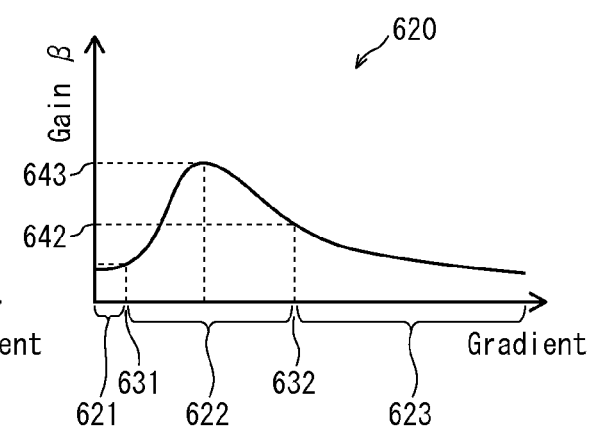

Next, FIG. 9B illustrates a second specific example of the relationship between the gradient and the gain β in the correspondence table. A graph 620 illustrated in FIG. 9B represents the relationship between the gradient and the gain β, the horizontal axis representing the gradient, the vertical axis representing the gain. The graph 620 indicates that, in a range 621 where the gradient is smaller than a gradient value 631, the setting is made such that the gain β is smaller than a gain value 641 and is almost constant. Also, in a range 622 where the gradient is greater than the gradient value 631 and smaller than a gradient value 632, the setting is made such that the gain β increases once and then decreases. That is to say, in the range 622, as the gradient increases, the gain β increases drastically from the gain value 641 to a gain value 643, the peak value, and then decreases drastically from the gain value 643 to a gain value 642. Furthermore, in a range 623 where the gradient is greater than the gradient value 632, the setting is made such that the gain β decreases smoothly as the gradient increases.

As described above, for the case illustrated in FIG. 9B, the setting is made such that, in a range where the gradient is small, the gain β is kept to be small; in a range where the gradient is present to a certain extent, the gain β is increased; and in a range where the gradient is great, the gain β is decreased to be small again.

By setting the relationship between the gradient and the gain β as illustrated in FIG. 9B, in the range 622 where the image is considered to include a fine texture, the gain is increased so that the effect of the fine-texture portion is maintained and the effect of the ranges 621 and 623 other than the range 622 is made small.

As described above, in correcting the difference value by using the gradient information, corrected difference values are obtained by determining values of gain β depending on the gradient of the area S, namely, the flatness of the area S, and multiplying the difference value by the determined values of gain β. The difference values are corrected in this way.

Note that the gain β is basically a value not greater than 1, but may be set to a value not smaller than 1 to enhance an area having a certain gradient. The gain β may be set approximately within the range from 0 times to 16 times.

(b) Second Correction Method

The adjustment unit 107 may adopt a second correction method in which the difference value is corrected by using the permissible amplitude received as the feature from the feature generating unit 103. In this correction using the permissible amplitude, a correction is made with regard to a portion exceeding the permissible amplitude.

The adjustment unit 107 repeatedly performs the following processes (i) to (v) for each of all the pixels constituting the received second high-resolution image.

(i) Select one pixel from the second high-resolution image and extract the pixel value of the selected pixel.

(ii) Select a permissible amplitude (the maximum value and the minimum value) corresponding to the selected pixel, from received permissible amplitudes.

(iii) Judge whether or not the extracted pixel value is within a range that is defined by the selected maximum value and minimum value. That is to say, judge whether or not the extracted pixel value satisfies the condition that the extracted pixel value is not greater than the selected maximum value and is not smaller than the selected minimum value.

(iv) When it is judged that the extracted pixel value is not within the range, calculate a corrected difference value by multiplying the gain β by a difference value corresponding to the selected pixel, and output the calculated corrected difference value.

(v) When it is judged that the extracted pixel value is within the range, output the original difference without multiplying the gain β by a difference value corresponding to the selected pixel.

Figure 10:
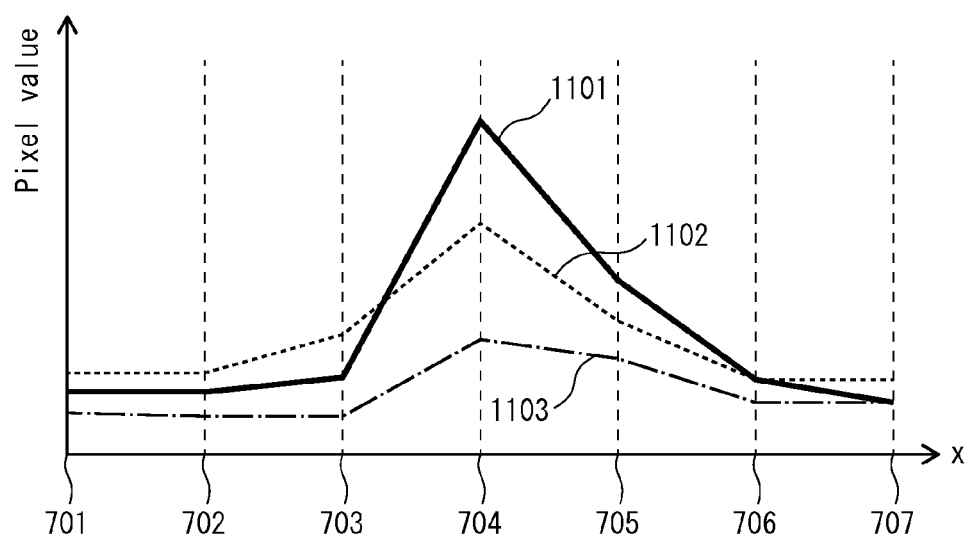
FIG. 10 illustrates one example of the change 1101 in pixel value over pixels arranged in the x axis direction in the second high-resolution image, the change 1102 in the maximum value of the permissible amplitude, and the change 1103 in the minimum value of the permissible amplitude.
Figure 11:
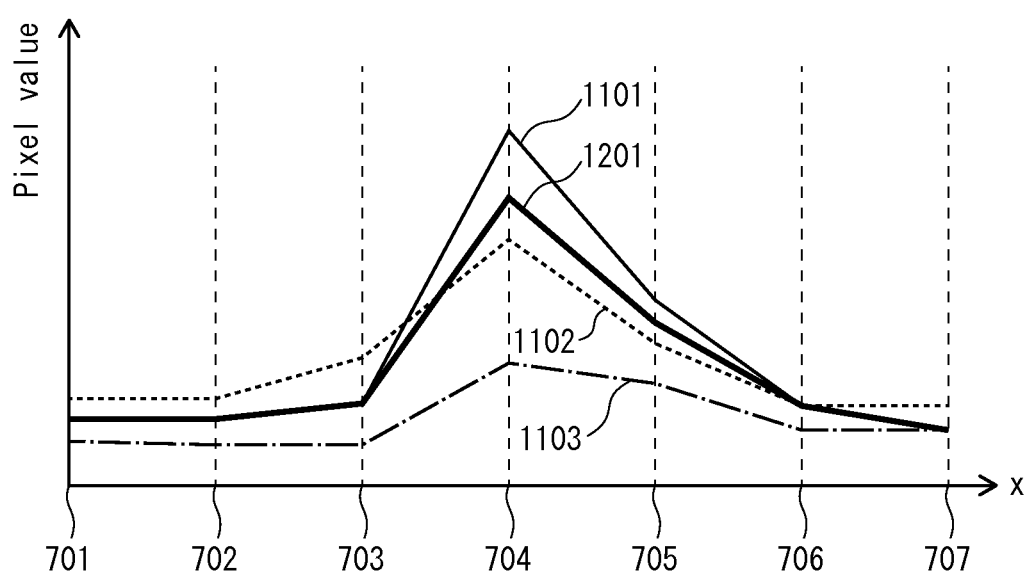
FIG. 11 illustrates one example of the change 1101 in pixel value over pixels arranged in the x axis direction in the second high-resolution image, the change 1102 in the maximum value of the permissible amplitude, the change 1103 in the minimum value of the permissible amplitude, and the change 1201 in pixel value over pixels arranged in the x axis direction in the third high-resolution image.

The following describes the second correction method with reference to FIGS. 10 and 11.

In FIG. 10, the horizontal axis represents the x coordinate and the vertical axis represents the pixel value. Furthermore, in FIG. 10, 1101 represents a change in pixel value over pixels arranged at positions indicated by a specific y coordinate and x coordinates 701, 702, ..., 707, in the second high-resolution image output from the super resolution enlargement unit 104. Furthermore, 1102 and 1103 respectively represent changes in the maximum value and the minimum value of the permissible amplitude over the positions indicated by the specific y coordinate and x coordinates 701, 702, ..., 707.

In FIG. 10, pixel values of pixels arranged at positions indicated by the specific y coordinate and x coordinates 701, 702, 703, and 707 are within the range of the maximum and minimum values at the corresponding positions. On the other hand, pixel values of pixels arranged at positions indicated by the specific y coordinate and x coordinates 704 and 705 are greater than the maximum values at the corresponding positions.

Accordingly, the adjustment unit 107 calculates corrected difference values by multiplying the gain β by difference values calculated for the positions indicated by the specific y coordinate and x coordinates 704 and 705, and outputs the calculated corrected difference values.

Also, the adjustment unit 107 outputs the original difference values as the corrected difference values with regard to the positions indicated by the specific y coordinate and x coordinates 701, 702, 703, 706 and 707.

The combination unit 108, which is described later, generates the third high-resolution image by using the corrected difference values calculated as described above, and outputs the third high-resolution image.

In FIG. 11, the horizontal axis represents the x coordinate and the vertical axis represents the pixel value. FIG. 11 illustrates a change 1201 in pixel value over pixels arranged at positions indicated by the specific y coordinate and x coordinates 701, 702, ..., 707, in the third high-resolution image generated by the combination unit 108, as well as the changes 1101, 1102 and 1103 illustrated in FIG. 10.

As illustrated in FIG. 11, compared with the second high-resolution image, in the third high-resolution image, the pixel values at the positions indicated by the specific y coordinate and x coordinates 704 and 705 have been corrected downward.

That is to say, the pixel values at the positions have been decreased by the correction.

In this way, the adjustment unit 107 corrects the difference value with regard to a portion exceeding the permissible amplitude.

(c) Other Correction Methods

The following describes another method for correction.

First, gains β1 and β2 are calculated independently by the above-described first and second correction methods, and the calculated gains β1 and β2 are added.

Gain β=gain β1+gain β2

Next, a corrected difference value is calculated by multiplying the difference by the calculated gain β.

The following describes a further method for correction.

A corrected difference value is calculated by the above-described first correction method, and the calculated corrected difference value is output to the combination unit 108. The combination unit 108 generates the third high-resolution image by using the corrected difference value and the first high-resolution image. Subsequently, the adjustment unit 107 judges by the second correction method whether or not the third high-resolution image has a portion exceeding the permissible amplitude, and with regard to pixels exceeding the permissible amplitude, calculates a doubly corrected difference value by multiplying the corrected difference value by a gain obtained by the second correction method. The combination unit 108 then generates a fourth high-resolution image by adding the doubly corrected difference value to the pixels exceeding the permissible amplitude of the third high-resolution image, and outputs the generated fourth high-resolution image.

(6) Combination Unit 108

The combination unit 108 receives the first high-resolution image from the enlargement interpolation unit 105, receives corrected difference values from the adjustment unit 107, generates a third high-resolution image by adding the corrected difference values to pixel values of the corresponding pixels of the first high-resolution image, and outputs the generated third high-resolution image.

Third high-resolution image (x,y)=first high-resolution image (x,y)+corrected difference value (x,y)

Since the corrected difference value is obtained by correcting the difference value between corresponding pixels of the first and second high-resolution images for each pixel constituting the high-resolution image, the corrected difference value is added to the pixel value of each corresponding pixel constituting the first high-resolution image, thereby obtaining the result of the corrected super resolution process.

3. Operation

The following describes the operation of the image processing device 10.

(1) Operation of Image Processing Device 10

Figure 12:
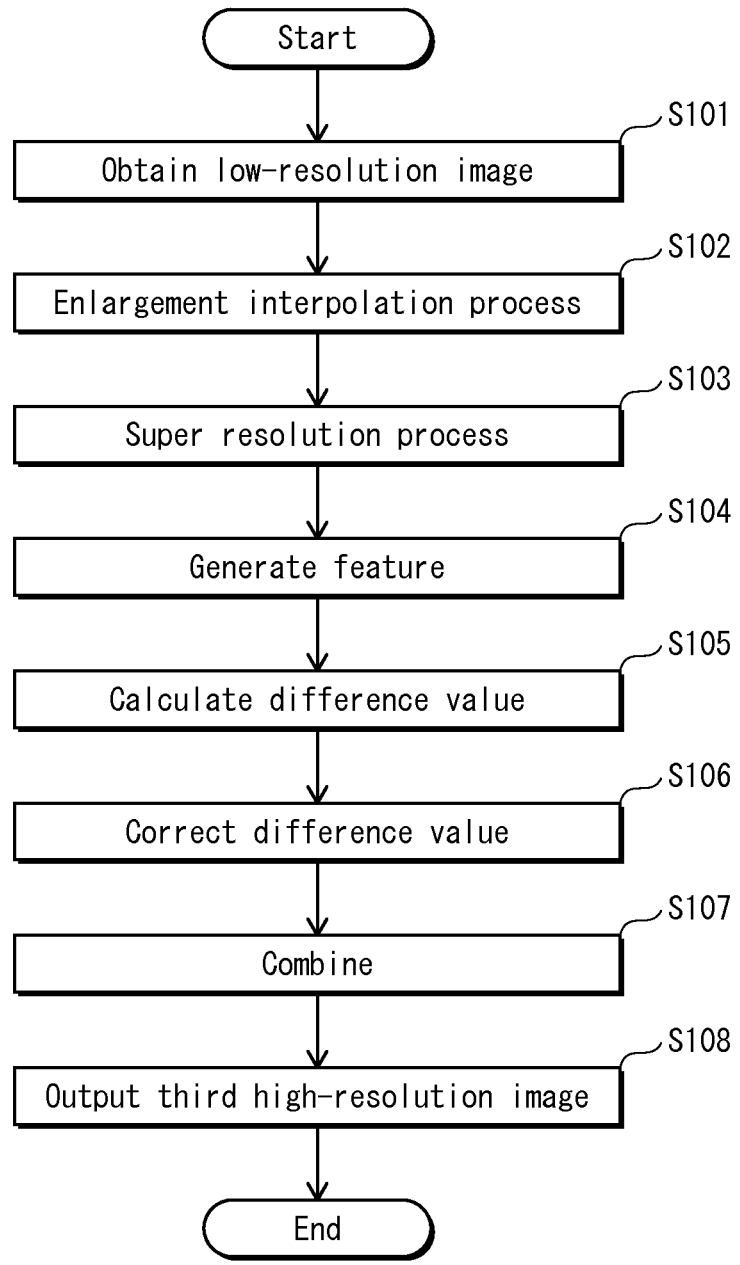
FIG. 12 is a flowchart illustrating the operation of the image processing device 10, centering on the operation of the image processing unit 100.

The following describes the operation of the image processing device 10 with reference to the flowchart illustrated in FIG. 12, centering on the operation of the image processing unit 100.

The input unit 201 obtains a low-resolution image (step S101); the enlargement interpolation unit 105 generates a first high-resolution image by performing the enlargement interpolation process (step S102); the super resolution enlargement unit 104 generates a second high-resolution image by performing the super resolution process (step S 103); the feature generating unit 103 generates the feature (step S104); the difference calculating unit 106 calculates the difference value (step S105); the adjustment unit 107 calculates the corrected difference value (step S106); the combination unit 108 generates the third high-resolution image by adding the corrected difference value to the first high-resolution image (step S107); and outputs the generated third high-resolution image (step S108).

(2) Operation of Enlargement Interpolation Unit 105

Figure 13:
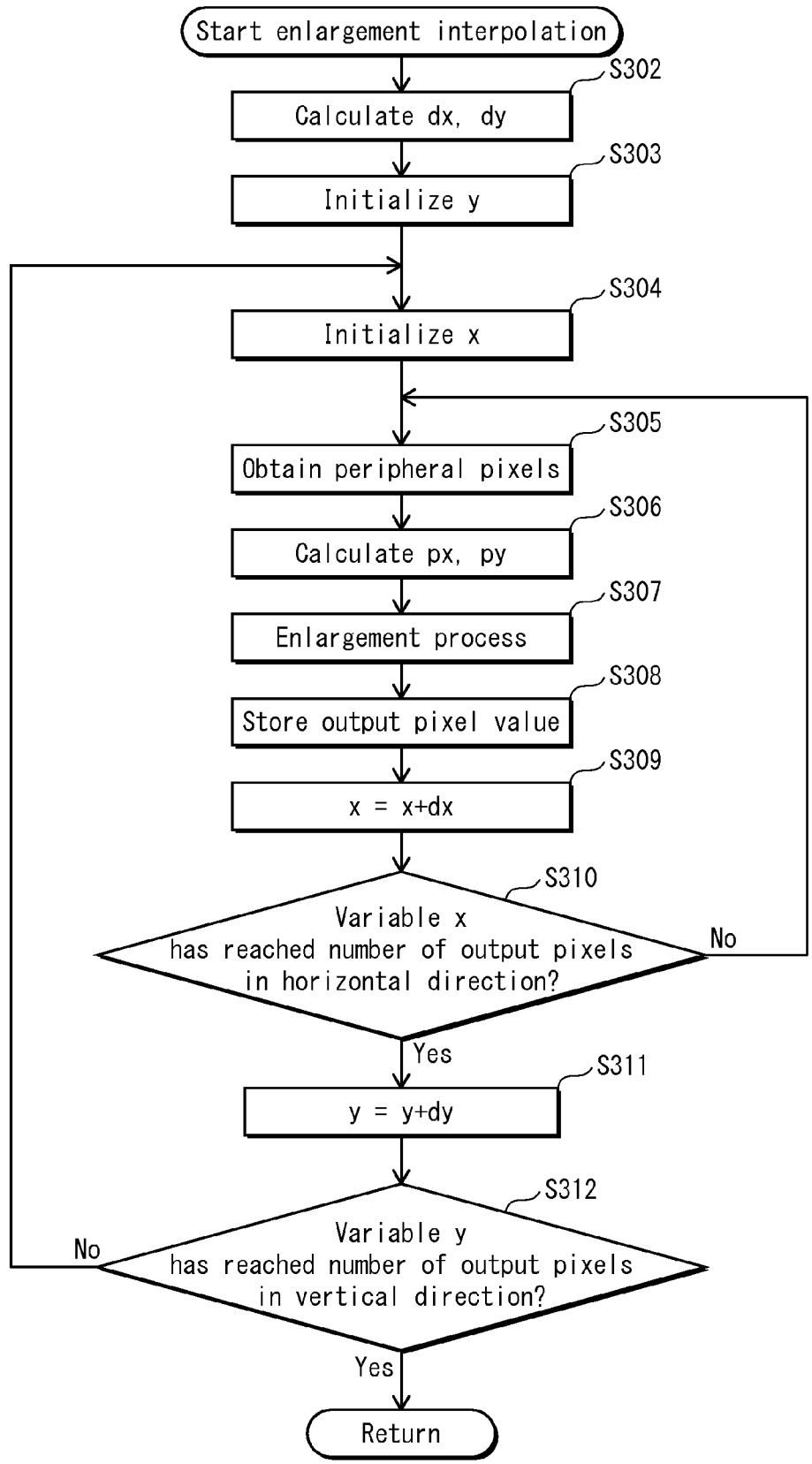
FIG. 13 is a flowchart illustrating the operation of the enlargement interpolation unit 105.

The following describes the operation of the enlargement interpolation unit 105 with reference to the flowchart illustrated in FIG. 13.

The enlargement interpolation unit 105 calculates the interpolation interval dx in the horizontal direction and the interpolation interval dy in the vertical direction, based on the Equations 3 and 4, using the values in XS, in YS, outXS, and outYS, the value in XS indicating the number of pixels in the horizontal direction and the value in YS indicating the number of pixels in the vertical direction of the low-resolution image, and the value outXS indicating the number of pixels in the horizontal direction and the value outYS indicating the number of pixels in the vertical direction of the third high-resolution image that is to be output (step S302).

The enlargement interpolation unit 105 initializes variable y to 0 (S303); initializes variable x to 0 (S304); and obtains values of peripheral pixels centered on the coordinates (x,y) from the low-resolution image (S305). The enlargement interpolation unit 105 then calculates the decimal parts px and py of the x and y coordinates (S306).

Subsequently, the enlargement interpolation unit 105 performs the enlargement interpolation process by using the values px and py and the pixel values of peripheral pixels centered on the point (x,y) of the low-resolution image (S307); stores, as the output pixel values, the pixel values output from the enlargement interpolation process (S308); and adds dx to the variable x (S309). Here, when the variable x does not exceed the value outXS indicating the number of pixels in the horizontal direction (No in S310), the control returns to S305 to repeat the processes. Also, when the variable x exceeds the value outXS (Yes in S310), the enlargement interpolation unit 105 adds dy to the variable y (S311). When the variable y does not exceed the value outYS (No in S312), the control returns to S304 to repeat the processes. When the variable y exceeds the value outYS (Yes in S312), the process ends since pixel values of all pixels constituting the first high-resolution image have been output.

4. Conclusion

With execution of the above-described process, the result of the super resolution process is corrected. By making a correction using the gradient information, it is possible to restrict a noise from occurring in a portion where the change of pixel values of pixels in an image is flat, or from occurring in a portion such as an edge where the gradient is great. Also, by making a correction using the permissible amplitude, it is possible to correct a portion where a protruding noise has occurred to pixel values of pixels in the low-resolution image that is an input image. By performing the above-described correction processes, it is possible to restrict noises that have occurred in the super resolution process and obtain a visually excellent image.

(Other Modifications)

Up to now, the present invention has been described through an embodiment thereof. However, the present invention is not limited to the embodiment, but includes, for example, the following modifications.

(1) The difference calculating unit 106 may calculate the difference value (x,y) based on the following Equation 17 instead of Equation 15.

Difference value (x,y)=(pixel value of pixel (x,y) in first high-resolution image)−(pixel value of pixel (x,y) in second high-resolution image)  (Equation 17)

In this case, the combination unit 108 generates the third high-resolution image based on the following Equation 18.

Third high-resolution image (x,y)=first high-resolution image (x,y)−corrected difference value (x,y)  (Equation 18)

(2) The super resolution enlargement unit 104 may use the super resolution enlargement process method disclosed in Non-Patent Literature 1 or 2.

(3) The following structures are applicable.

According to one aspect of the present invention, there is provided an image processing device for generating a high-resolution image from a low-resolution image, comprising: an obtaining circuit that obtains the low-resolution image; an enlargement interpolation circuit that generates a first high-resolution image that is higher in resolution than the low-resolution image, by performing an enlargement interpolation on the obtained low-resolution image; a super resolution processing circuit that generates, from the low-resolution image, a second high-resolution image that is equal in resolution to the first high-resolution image, by tracing back a process through which an image is assumed to be degraded in resolution, the process being represented by a degradation model; a feature generating circuit that generates a feature for each of a plurality of pixels constituting the first high-resolution image by using the low-resolution image; a difference calculating circuit that calculates, for each of the plurality of pixels constituting the first high-resolution image, a difference value between a value of that pixel and a value of a corresponding pixel in the second high-resolution image; an adjustment circuit that calculates a corrected difference value by correcting the calculated difference value by using the generated feature; and a combination circuit that generates a third high-resolution image by adding corrected difference values calculated by the adjustment circuit to values of corresponding pixels in the first high-resolution image.

According to another aspect of the present invention, there is provided an image processing device for generating a high-resolution image from a low-resolution image, comprising: a memory storing a computer program that is composed of a plurality of computer instructions; and a processor configured to read the computer instructions one by one from the computer program stored in the memory, decode the read computer instructions, and operate in accordance with the decoded computer instructions. The computer program causes a computer to execute: an obtaining step of obtaining the low-resolution image; an enlargement interpolation step of generating a first high-resolution image that is higher in resolution than the low-resolution image, by performing an enlargement interpolation on the obtained low-resolution image; a super resolution processing step of generating, from the low-resolution image, a second high-resolution image that is equal in resolution to the first high-resolution image, by tracing back a process through which an image is assumed to be degraded in resolution, the process being represented by a degradation model; a feature generating step of generating a feature for each of a plurality of pixels constituting the first high-resolution image by using the low-resolution image; a difference calculating step of calculating, for each of the plurality of pixels constituting the first high-resolution image, a difference value between a value of that pixel and a value of a corresponding pixel in the second high-resolution image; an adjustment step of calculating a corrected difference value by correcting the calculated difference value by using the generated feature; and a combination step of generating a third high-resolution image by adding corrected difference values calculated by the adjustment unit to values of corresponding pixels in the first high-resolution image.

According to a still another aspect of the present invention, there is provided a computer-readable non-transitory recording medium storing a computer program for use in an image processing device for generating a high-resolution image from a low-resolution image. The computer program causes the image processing device, which is a computer, to execute: an obtaining step of obtaining the low-resolution image; an enlargement interpolation step of generating a first high-resolution image that is higher in resolution than the low-resolution image, by performing an enlargement interpolation on the obtained low-resolution image; a super resolution processing step of generating, from the low-resolution image, a second high-resolution image that is equal in resolution to the first high-resolution image, by tracing back a process through which an image is assumed to be degraded in resolution, the process being represented by a degradation model; a feature generating step of generating a feature for each of a plurality of pixels constituting the first high-resolution image by using the low-resolution image; a difference calculating step of calculating, for each of the plurality of pixels constituting the first high-resolution image, a difference value between a value of that pixel and a value of a corresponding pixel in the second high-resolution image; an adjustment step of calculating a corrected difference value by correcting the calculated difference value by using the generated feature; and a combination step of generating a third high-resolution image by adding corrected difference values calculated by the adjustment unit to values of corresponding pixels in the first high-resolution image.

(4) Each of the above-described devices may be a computer system that includes a microprocessor, ROM, RAM, and hard disk unit. A computer program is stored in the RAM or the hard disk unit. The microprocessor operates in accordance with the computer program, thereby enabling that device to realize its functions. The computer program mentioned above is composed of a plurality of instruction codes which each instructs the computer to realize a predetermined function.

(5) The present invention may be an image processing method for use in an image processing device. The present invention may be a computer program that allows a computer to realize the method, or may be a digital signal representing the computer program.

Furthermore, the present invention may be a computer-readable recording medium such as a flexible disk, a hard disk, CD-ROM, MO, DVD, DVD-ROM, DVD-RAM, BD (Blu-ray Disc), or a semiconductor memory, that contains the computer program or the digital signal recorded thereon. Furthermore, the present invention may be the computer program or the digital signal recorded on any of the above-mentioned recording mediums.

Furthermore, the present invention may be the computer program or the digital signal transmitted via an electric communication line, a wireless or wired communication line, a network of which the Internet is representative, or a data broadcast.

Also, the present invention may be a computer system that includes a microprocessor and a memory, wherein a computer program is stored in the memory, and the microprocessor operates in accordance with the computer program.

Furthermore, the computer program or the digital signal may be recorded on any of the above-described recording mediums and transferred in that form to another independent computer system to be implemented therein, or the computer program or the digital signal may be transferred to another independent computer system via the network or the like and may be implemented in the other independent computer system.

(6) The present invention may be any combination of the above-described embodiments and modifications.

When a degradation model used in the super resolution process differs from a real degradation process of an obtained low-resolution image, the image processing device of the present invention can obtain a visually excellent high-resolution image by restricting noises from occurring, and thus is suitable for an image processing technology for generating a high-resolution image from a low-resolution image.

REFERENCE SIGNS LIST 101 low-resolution image
102 third high-resolution image
103 feature generating unit
104 super resolution enlargement unit
105 enlargement interpolation unit
106 difference calculating unit
107 adjustment unit
108 combination unit
201 input unit
202 tuner
203 external terminal
204 memory card
205 memory
206 processor
207 decoding unit
208 display control unit
209 video driver
210 hard disk
211 display device

The invention claimed is:

1. An image processing device for generating a high-resolution image from a low-resolution image, comprising:
a non-transitory memory storing a program; and
a hardware processor that executes the program and causes the image processing device:
obtain the low-resolution image;
generate a first high-resolution image that is higher in resolution than the low-resolution image, by performing an enlargement interpolation on the low-resolution image;
generate, from the low-resolution image, a second high-resolution image that is equal in resolution to the first high-resolution image, by tracing back a process through which an image is assumed to be degraded in resolution, the process being represented by a degradation model;
generate a feature at positions on the low-resolution image, the positions corresponding to positions of pixels on the first-high resolution image;
calculate, for each of the plurality of pixels constituting the first high-resolution image, a difference value between a value of that pixel and a value of a corresponding pixel in the second high-resolution image;
calculate a corrected difference value by correcting the calculated difference value by using the generated feature; and generate a third high-resolution image by adding corrected difference values calculated by the adjustment unit to values of corresponding pixels in the first high-resolution image, wherein the image processing device generates, as the feature, gradient information indicating a gradient of a value of a pixel in an image area in the low-resolution image corresponding to peripheral pixels of each of the plurality of pixels constituting the first high-resolution image, the gradient information being indicated by a norm operation on a rate of change in an x-axis direction and a rate of change in a y-axis direction with respect to values included in the image area, corrects the calculated difference value by using the generated gradient information, generates, as the feature, a permissible range from an image area in the low-resolution image corresponding to peripheral pixels of each of the plurality of pixels constituting the first high-resolution image, the permissible range being a range of values that can be taken by that pixel, determines whether or not the permissible range is exceeded for each pixel of the third high-resolution image, calculates a gain that increases or decreases depending on the gradient information, calculates the corrected difference value by multiplying the calculated gain by the difference value, and calculates a twice corrected difference value by multiplying the calculated gain by the corrected difference value for each pixel that exceeds the permissible range, and generates a fourth high-resolution image by adding the twice corrected difference value to each pixel of the third high-resolution image exceeding the permissible range, and outputs the fourth high-resolution image.

2. The image processing device of claim 1, wherein the image processing device calculates a gain that increases or decreases depending on the gradient information, and calculates the corrected difference value by multiplying the calculated gain by the difference value.

3. The image processing device of claim 1, wherein the image processing device generates, as the feature, a permissible range from an image area in the low-resolution image corresponding to peripheral pixels of each of the plurality of pixels constituting the first high-resolution image, the permissible range being a range of values that can be taken by that pixel, and corrects the calculated difference value for each pixel in the second high-resolution image that has a value exceeding the permissible range.

4. An image processing method for use in an image processing device for generating a high-resolution image from a low-resolution image, comprising:

obtaining the low-resolution image;

generating a first high-resolution image that is higher in resolution than the low-resolution image, by performing an enlargement interpolation on the low-resolution image;

generating, from the low-resolution image, a second high-resolution image that is equal in resolution to the first high-resolution image, by tracing back a process through which an image is assumed to be degraded in resolution, the process being represented by a degradation model;

generating a feature at positions on the low-resolution image, the positions corresponding to positions of pixels on the first-high resolution image;

calculating, for each of the plurality of pixels constituting the first high-resolution image, a difference value between a value of that pixel and a value of a corresponding pixel in the second high-resolution image;

calculating a corrected difference value by correcting the calculated difference value by using the generated feature; and generating a third high-resolution image by adding corrected difference values calculated by the adjustment unit to values of corresponding pixels in the first high-resolution image, wherein the image processing method generates, as the feature, gradient information indicating a gradient of a value of a pixel in an image area in the low-resolution image corresponding to peripheral pixels of each of the plurality of pixels constituting the first high-resolution image, the gradient information being indicated by a norm operation on a rate of change in an x-axis direction and a rate of change in a y-axis direction with respect to values included in the image area, corrects the calculated difference value by using the generated gradient information, generates, as the feature, a permissible range from an image area in the low-resolution image corresponding to peripheral pixels of each of the plurality of pixels constituting the first high-resolution image, the permissible range being a range of values that can be taken by that pixel, determines whether or not the permissible range is exceeded for each pixel of the third high-resolution image, calculates a gain that increases or decreases depending on the gradient information, calculates the corrected difference value by multiplying the calculated gain by the difference value, and calculates a twice corrected difference value by multiplying the calculated gain by the corrected difference value for each pixel that exceeds the permissible range, and generates a fourth high-resolution image by adding the twice corrected difference value to each pixel of the third high-resolution image exceeding the permissible range, and outputs the fourth high-resolution image.

5. A computer-readable non-transitory recording medium storing a computer program for image processing for use in an image processing device for generating a high-resolution image from a low-resolution image, the computer program causing a computer to execute:

obtaining the low-resolution image;

generating a first high-resolution image that is higher in resolution than the low-resolution image, by performing an enlargement interpolation on the low-resolution image;

generating, from the low-resolution image, a second high-resolution image that is equal in resolution to the first high-resolution image, by tracing back a process through which an image is assumed to be degraded in resolution, the process being represented by a degradation model;

generating a feature at positions on the low-resolution image, the positions corresponding to positions of pixels on the first-high resolution image;

calculating, for each of the plurality of pixels constituting the first high-resolution image, a difference value between a value of that pixel and a value of a corresponding pixel in the second high-resolution image;

calculating a corrected difference value by correcting the calculated difference value by using the generated feature; and generating a third high-resolution image by adding corrected difference values calculated by the adjustment unit to values of corresponding pixels in the first high-resolution image, wherein the computer program causes the computer to generate, as the feature, gradient information indicating a gradient of a value of a pixel in an image area in the low-resolution image corresponding to peripheral pixels of each of the plurality of pixels constituting the first high-resolution image, the gradient information being indicated by a norm operation on a rate of change in an x-axis direction and a rate of change in a y-axis direction with respect to values included in the image area, correct the calculated difference value by using the generated gradient information, generate, as the feature, a permissible range from an image area in the low-resolution image corresponding to peripheral pixels of each of the plurality of pixels constituting the first high-resolution image, the permissible range being a range of values that can be taken by that pixel, determine whether or not the permissible range is exceeded for each pixel of the third high-resolution image, calculate a gain that increases or decreases depending on the gradient information, calculate the corrected difference value by multiplying the calculated gain by the difference value, and calculate a twice corrected difference value by multiplying the calculated gain by the corrected difference value for each pixel that exceeds the permissible range, and generate a fourth high-resolution image by adding the twice corrected difference value to each pixel of the third high-resolution image exceeding the permissible range, and output the fourth high-resolution image.

* * * * *